(12) United States Patent
Eberhard

(10) Patent No.: US 10,351,086 B2
(45) Date of Patent: Jul. 16, 2019

(54) SENSOR MOUNTING BRACKET

(71) Applicant: Nissan North America, Inc., Franklin, TN (US)

(72) Inventor: Gary Eberhard, Oxford, MI (US)

(73) Assignee: Nissan North America, Inc., Franklin, TN (US)

( * ) Notice: Subject to any disclaimer, the term of this patent is extended or adjusted under 35 U.S.C. 154(b) by 272 days.

(21) Appl. No.: 15/282,706

(22) Filed: Sep. 30, 2016

(65) Prior Publication Data

US 2018/0094954 A1 Apr. 5, 2018

(51) Int. Cl.
*G01D 11/30* (2006.01)
*B60R 19/48* (2006.01)

(52) U.S. Cl.
CPC ............ *B60R 19/483* (2013.01); *G01D 11/30* (2013.01)

(58) Field of Classification Search
CPC .................................................... G01D 11/30
USPC ...................................................... 73/866.5
See application file for complete search history.

(56) References Cited

U.S. PATENT DOCUMENTS

| | | | |
|---|---|---|---|
| 6,227,501 B1 * | 5/2001 | Malcolm | B60R 19/483 248/27.3 |
| 8,441,366 B2 * | 5/2013 | Buss | B60J 5/101 296/146.4 |
| 9,243,439 B2 * | 1/2016 | Adams | E05F 15/73 |
| 2002/0130770 A1 * | 9/2002 | Keyworth | G01S 7/521 340/436 |

FOREIGN PATENT DOCUMENTS

| | | | | |
|---|---|---|---|---|
| EP | 1600336 A1 * | 11/2005 | ........... | B60R 19/483 |
| EP | 2275296 A2 | 1/2011 | | |
| EP | 2947773 A1 * | 11/2015 | ........... | H03K 17/955 |

* cited by examiner

*Primary Examiner* — Jamel E Williams
(74) *Attorney, Agent, or Firm* — Global IP Counselors, LLP

(57) ABSTRACT

A mounting bracket for a hands-free liftgate sensor of a vehicle includes a bracket body having a substantially rectangular shape configured to be disposed adjacent an inner surface of a vehicle rear fascia member. A plurality of upper sensor cutouts are disposed in the bracket body and extend in a lateral direction of the vehicle. A plurality of lower sensor cutouts are disposed in the bracket body and extend in the lateral direction of the vehicle. A central opening in the bracket body is disposed between the plurality of upper sensor cutouts and the plurality of lower sensor cutouts.

20 Claims, 11 Drawing Sheets

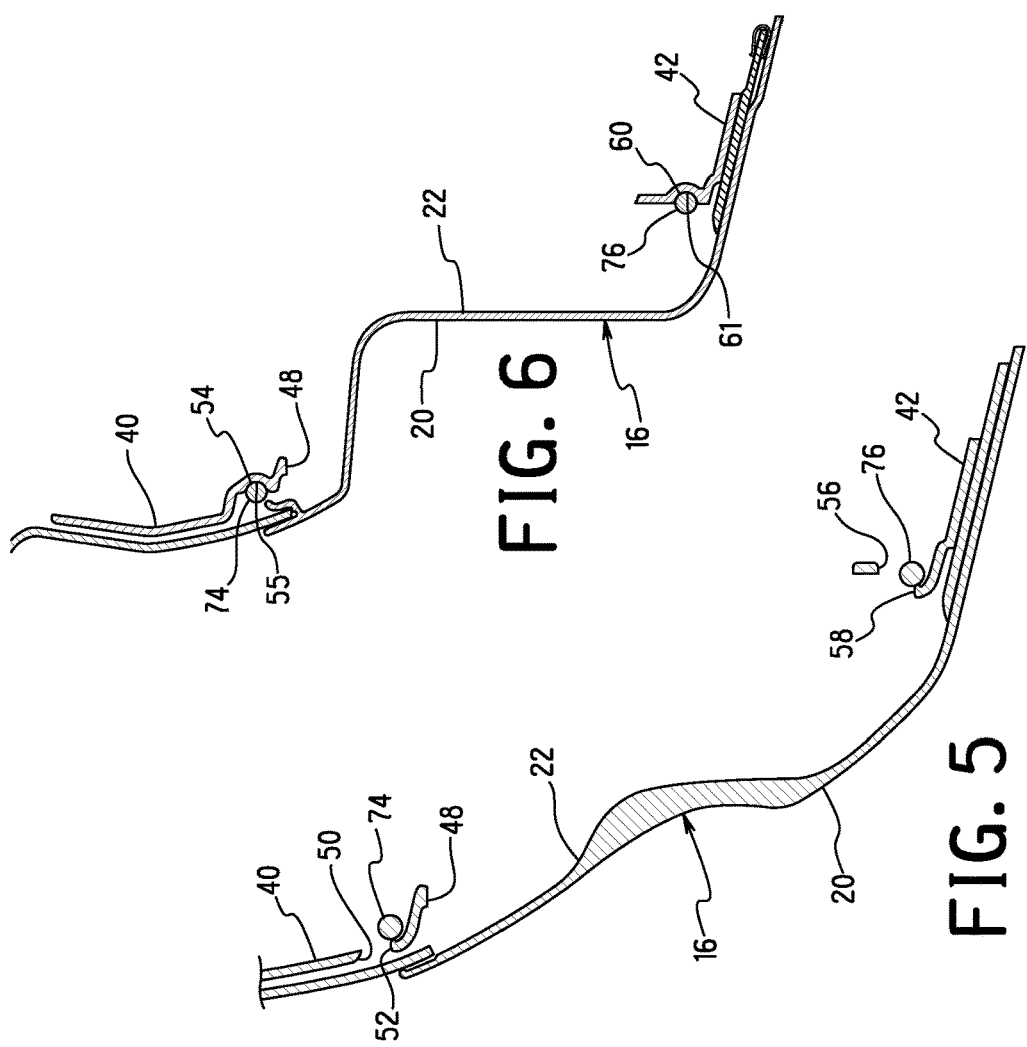

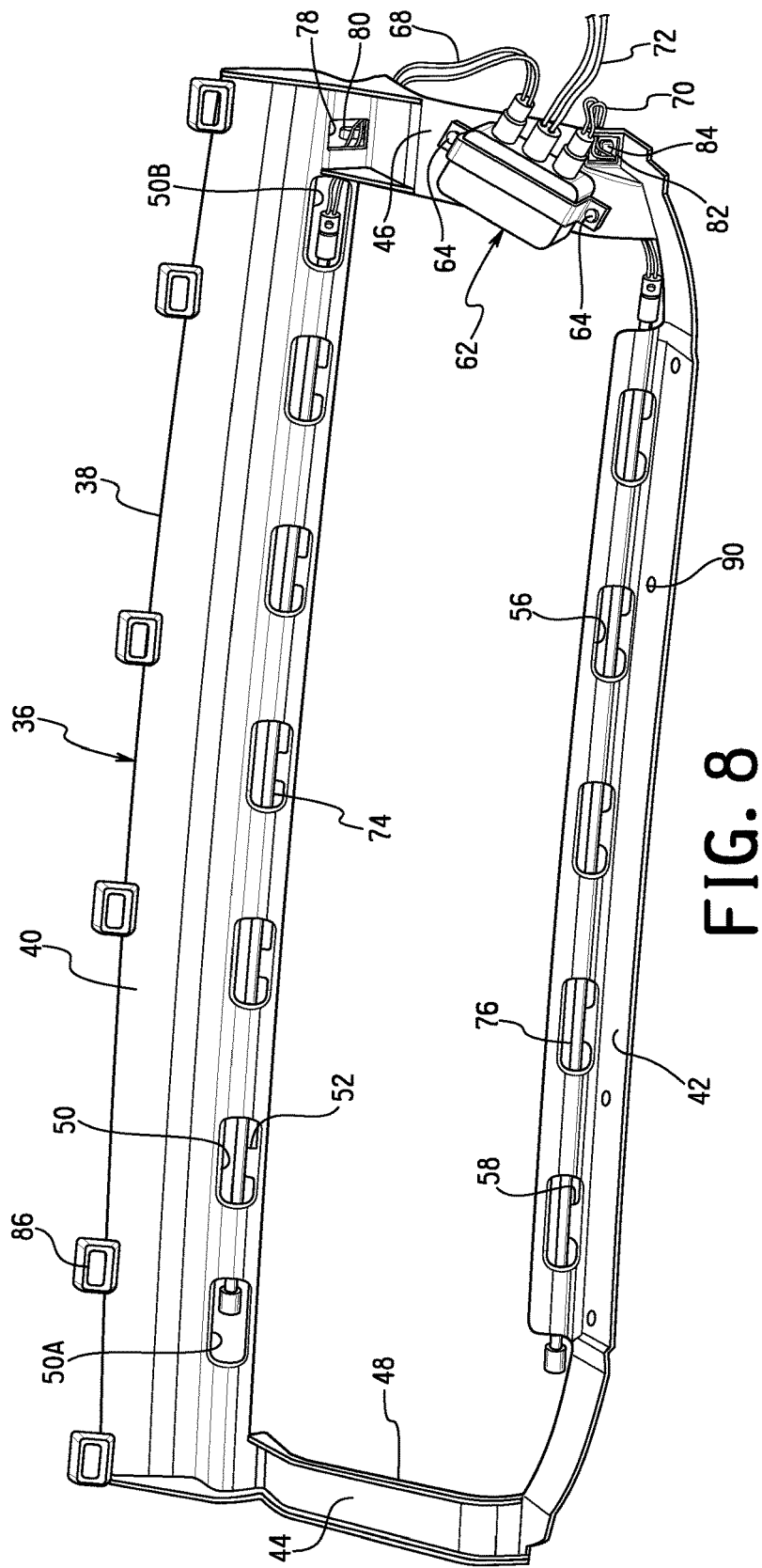

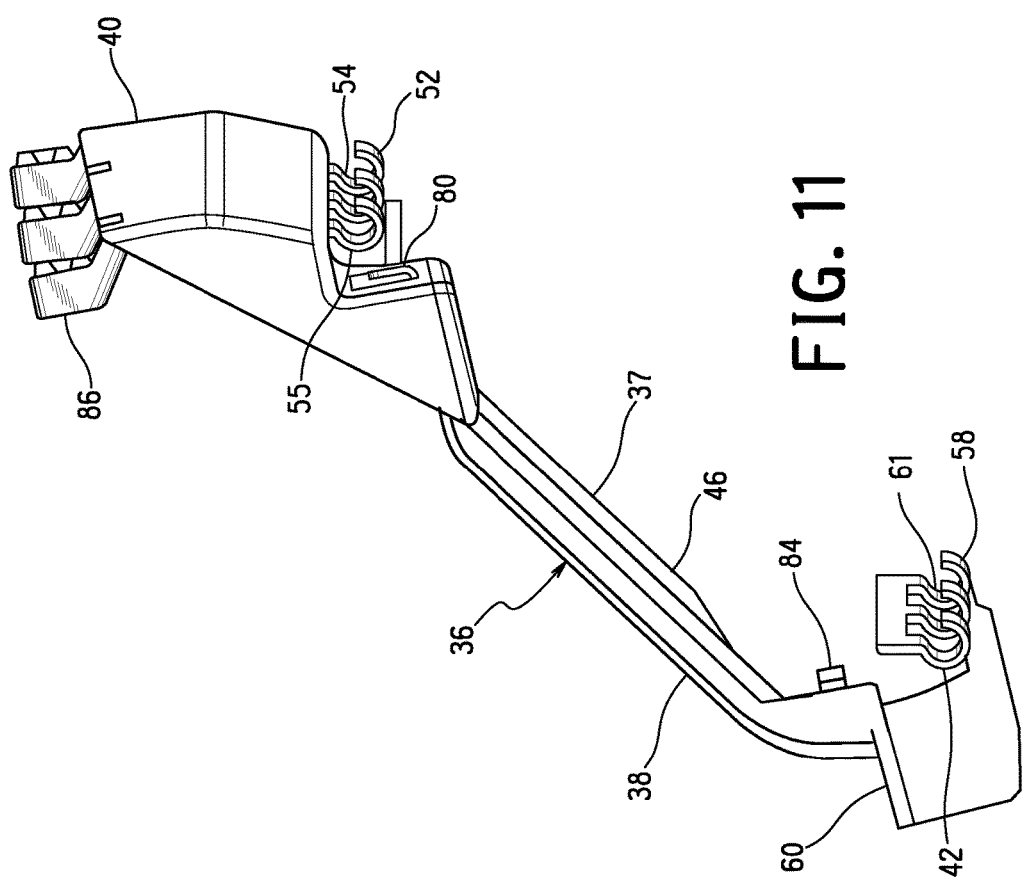

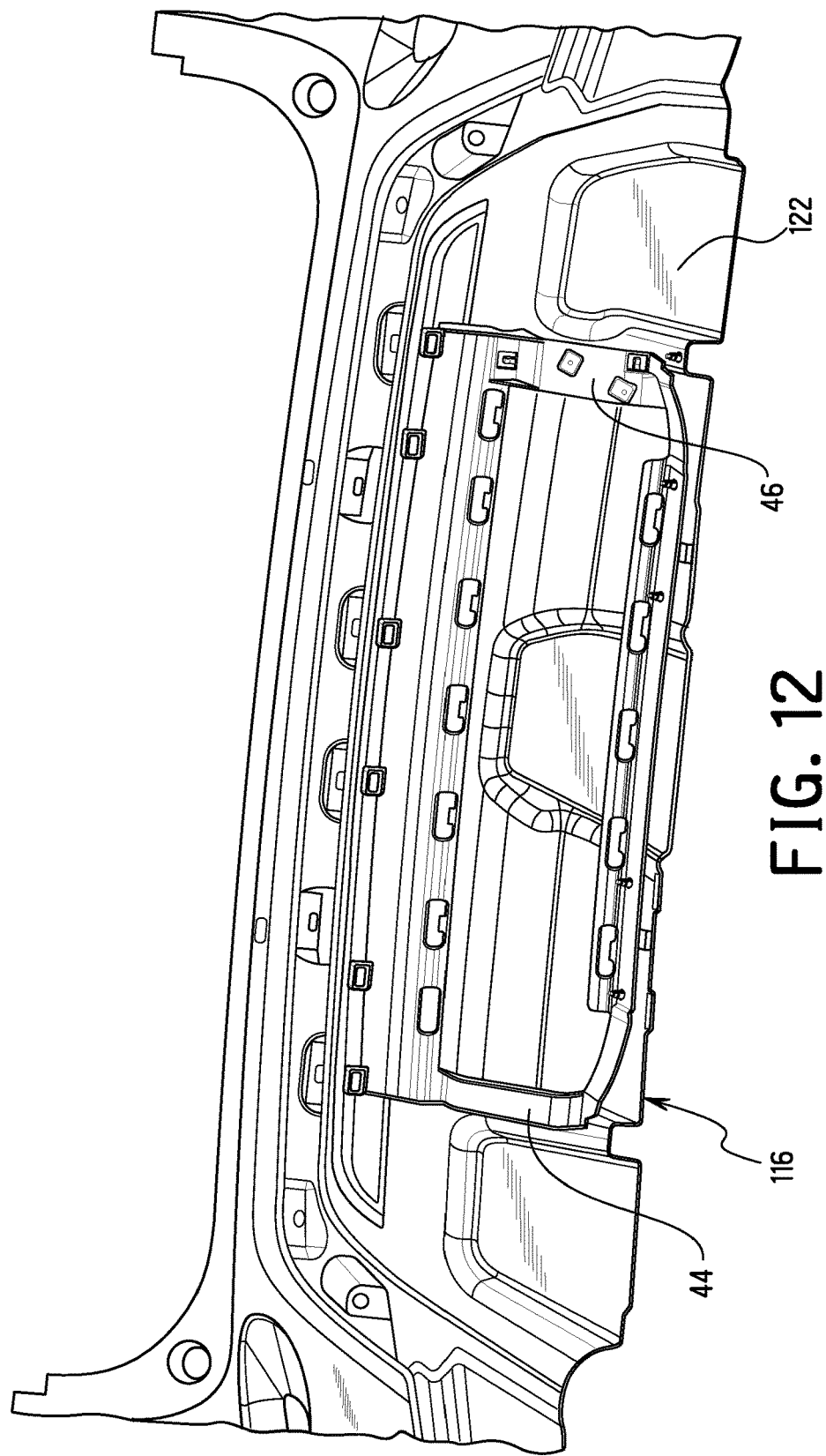

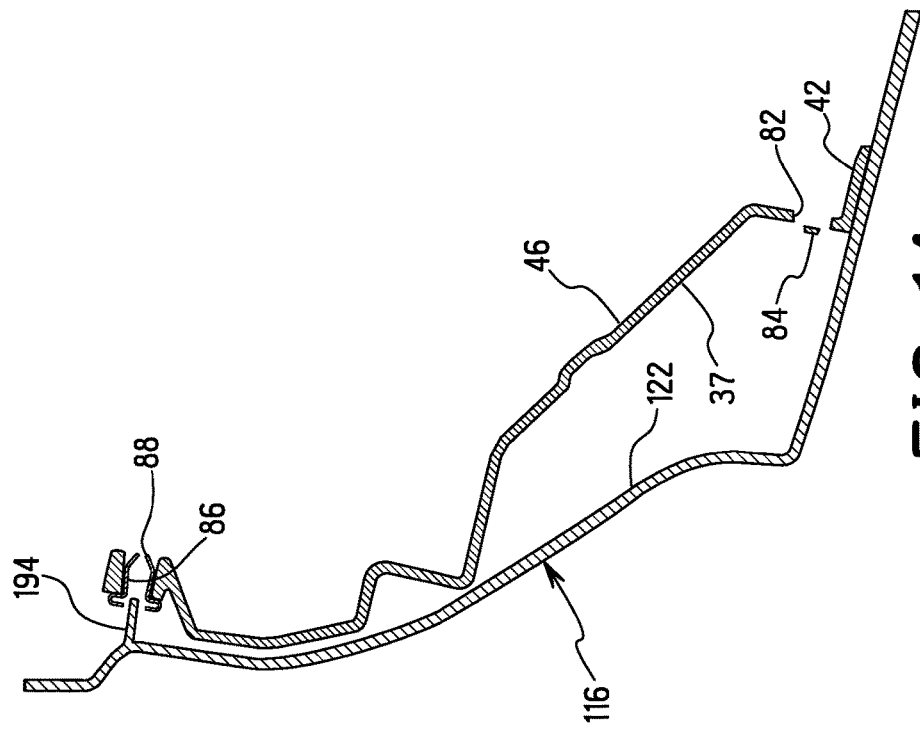
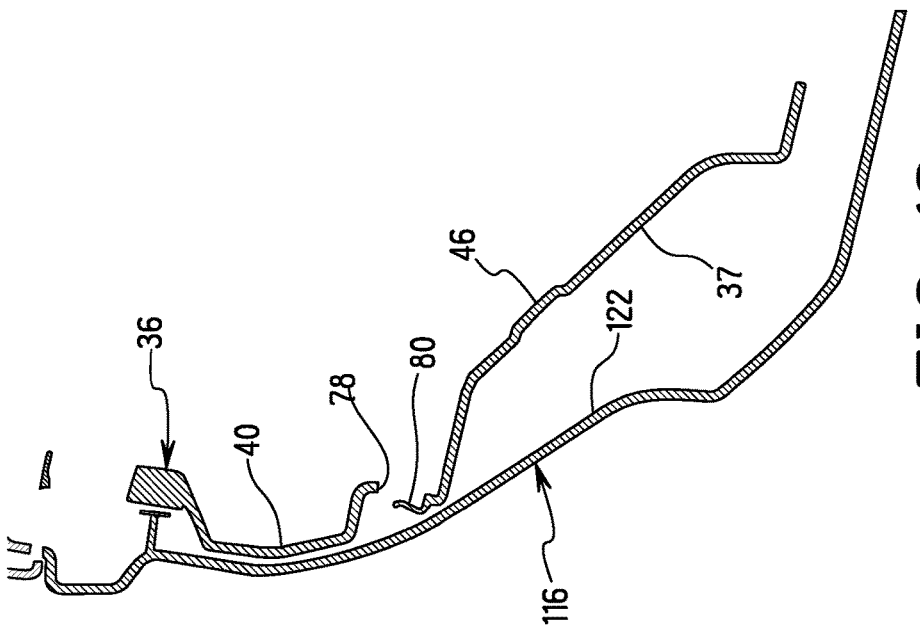

SENSOR MOUNTING BRACKET

BACKGROUND

Field of the Invention

The present invention generally relates to a sensor mounting bracket for a vehicle. More specifically, the present invention relates to a mounting bracket for a hands-free liftgate sensor of a vehicle. Still more specifically, the present invention relates to a vehicle including a mounting bracket for mounting a hands-free liftgate sensor thereto.

Background Information

Many current vehicles include a hands-free method of opening a vehicle door, such as a liftgate. Some of these vehicle mount a kick sensor to the vehicle to detect hands-free movement. A vehicle user can activate the kick sensor with hands-free movement, such as a kicking motion with the vehicle user's foot, to cause the liftgate to open. However, these kick sensors are inefficiently and expensively installed. Additionally, installation of these sensors can be at the expense of other desired accessories, such as vehicle tow hitches, such that a vehicle includes only one of the kick sensor and the tow hitch but not both.

SUMMARY

In view of the state of the known technology, one aspect of the present invention includes a mounting bracket for a hands-free liftgate sensor of a vehicle. The mounting bracket includes a bracket body having a substantially rectangular shape configured to be disposed adjacent an inner surface of a vehicle rear fascia member. A plurality of upper sensor cutouts are disposed in the bracket body and extend in a lateral direction of the vehicle. A plurality of lower sensor cutouts are disposed in the bracket body and extend in the lateral direction of the vehicle. A central opening in the bracket body is disposed between the plurality of upper sensor cutouts and the plurality of lower sensor cutouts.

Another aspect of the present invention includes a hands-free liftgate sensor mounting bracket for a vehicle. The vehicle includes a vehicle body structure and a rear fascia member connected to the vehicle body structure. A mounting bracket is connected to the rear fascia member. The mounting bracket includes a bracket body, a plurality of upper and lower fastener openings, and a central opening. The plurality of upper fastener openings receive a plurality of first fasteners to secure the bracket body to the rear fascia member. The plurality of lower fastener openings receive a plurality of second fasteners to secure the bracket body to the rear fascia member. The central opening in the bracket body is disposed between the plurality of upper fastener openings and the plurality of lower fastener openings.

BRIEF DESCRIPTION OF THE DRAWINGS

Referring now to the attached drawings which form a part of this original disclosure:

FIG. 5 is a side elevational view in cross section of the mounting bracket taken along line 5-5 of FIG. 3;

FIG. 6 is a side elevational view in cross section of the mounting bracket taken along line 6-6 of FIG. 3;

FIG. 7 is a side elevational view in cross section of the mounting bracket taken along line 7-7 of FIG. 3;

FIG. 8 is a perspective view of the mounting bracket of FIG. 2 with upper and lower sensors and an electronic control unit connected thereto;

FIG. 11 is a side elevational view of the mounting bracket of FIG. 9;

FIG. 12 is a perspective view of the mounting bracket attached to a rear fascia member of a vehicle not equipped with a tow hitch assembly;

FIG. 13 is an elevational view in cross section of the mounting bracket taken along line 13-13 of FIG. 12; and FIG. 14 is an elevational view in cross section of the mounting bracket taken along line 14-14 of FIG. 12.

DETAILED DESCRIPTION OF EXEMPLARY EMBODIMENTS

Figure 1:
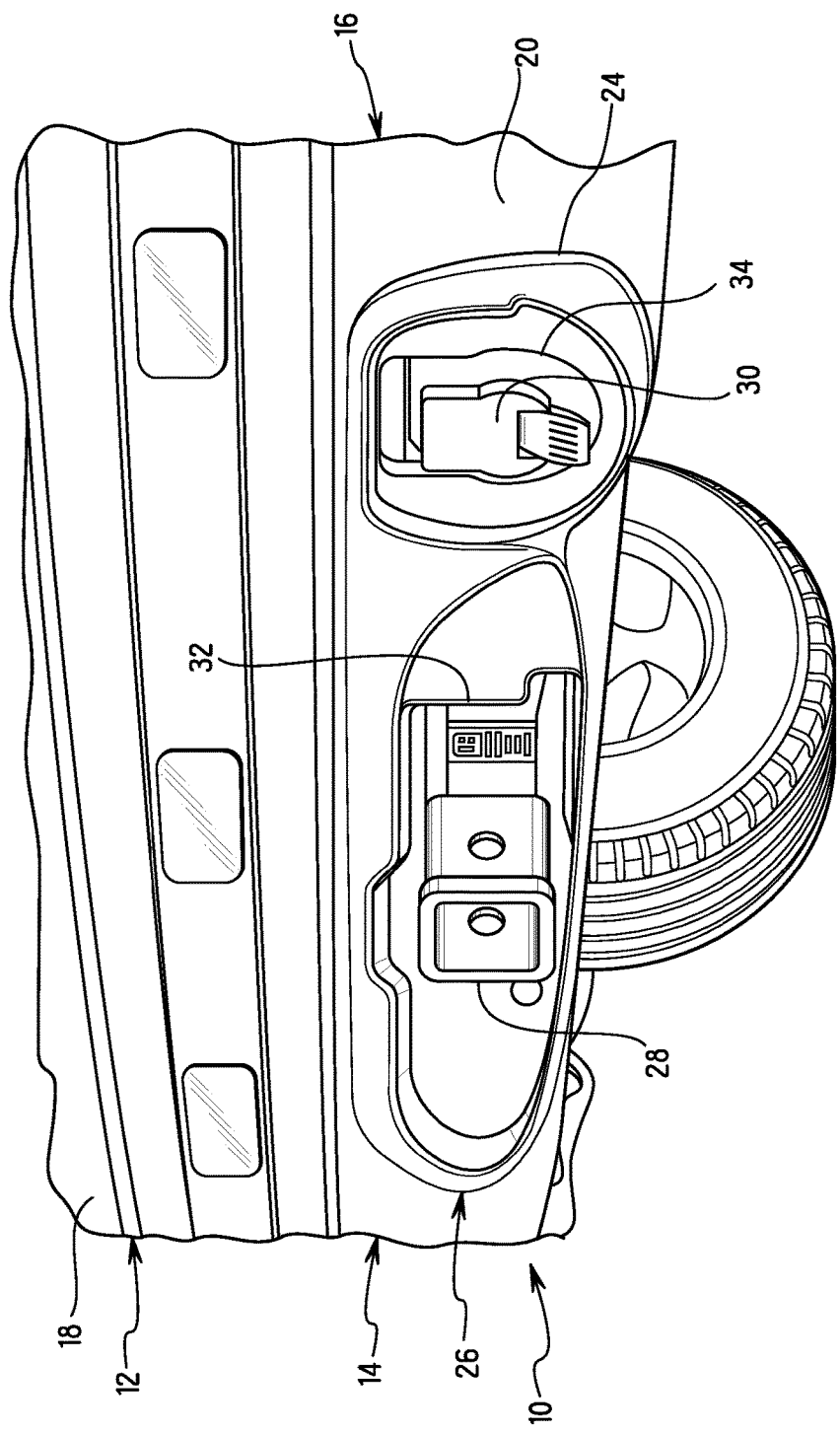
FIG. 1 is a rear perspective view of a vehicle including a tow hitch assembly.

Selected exemplary embodiments will now be explained with reference to the drawing figures. It will be apparent to those skilled in the art from this disclosure that the following descriptions of the exemplary embodiments are provided for illustration only and not for the purpose of limiting the invention as defined by the appended claims and their equivalents.

Referring initially to FIG. 1, a vehicle 10, such as a sport utility vehicle (SUV), includes a vehicle body structure 12, which supports a rear bumper assembly 14. The rear bumper assembly 14 includes a rear fascia member 16 and an energy absorbing member (e.g, a bumper, not shown). The rear fascia member 16 is attached to the energy absorbing member in any suitable manner. A door, such as a liftgate 18, is lockably connected to the vehicle body structure 12 in a conventional manner.

Figure 2:
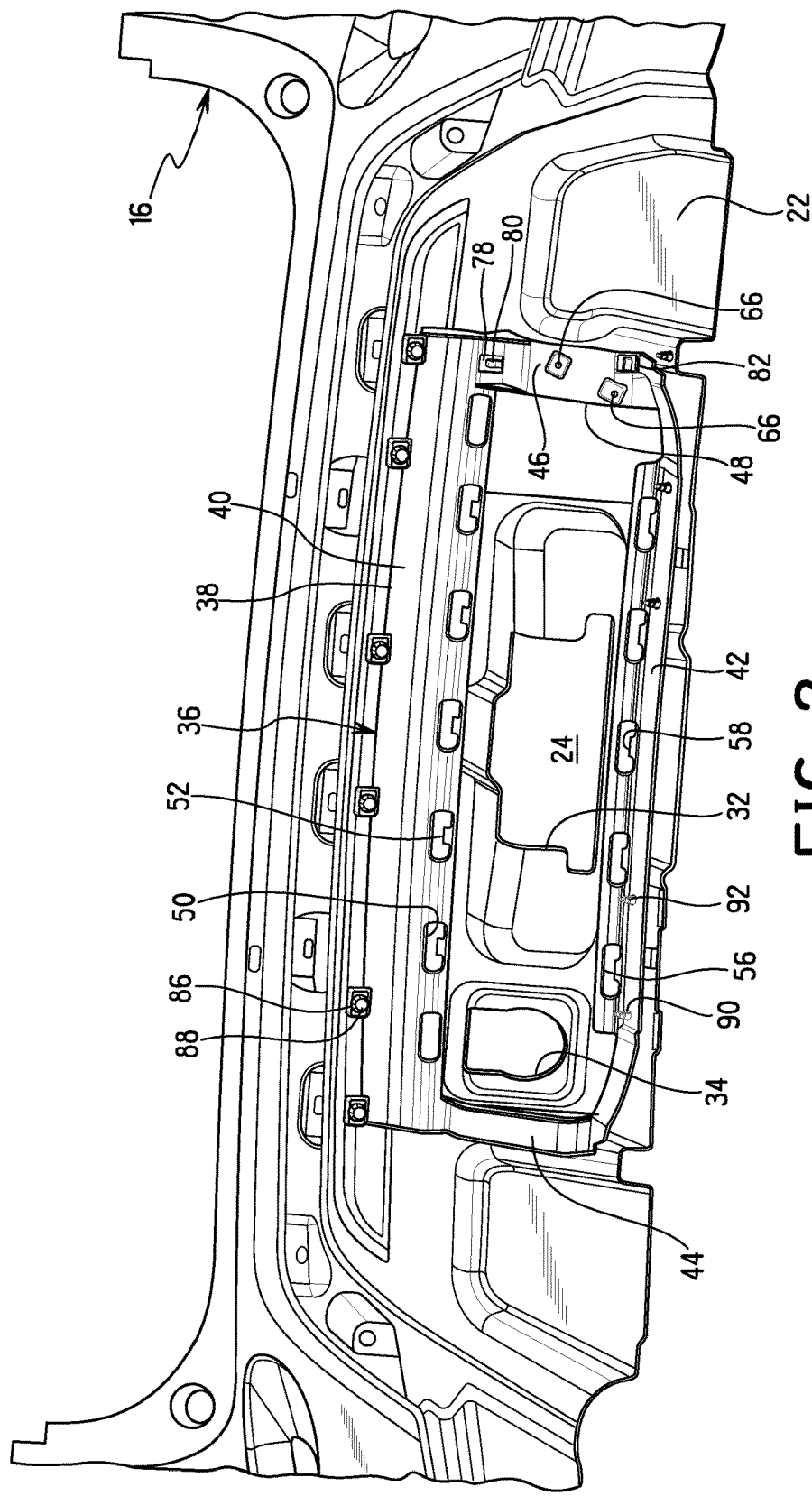
FIG. 2 is a rear perspective view of a rear fascia member of the vehicle of FIG. 1 to which a mounting bracket is attached in accordance with an exemplary embodiment of the present invention.

Referring to FIGS. 1 and 2, the rear fascia member 16 has an outer surface 20 facing an exterior of the vehicle 10 and an inner surface 22 facing an interior of the vehicle. An opening 24 is disposed in the rear fascia member 16 and is configured to receive a tow hitch assembly, which includes a tow hitch finisher 26, a tow hitch receiver 28 and an electrical connector 30. The tow hitch finisher 26 is disposed in the opening 24 and connected to the rear fascia member 16 in a conventional manner. The tow hitch finisher 26 has a first opening 32 configured to receive the tow hitch receiver 28 and a second opening 34 configured to receive the electrical connector 30.

A mounting bracket 36 in accordance with exemplary embodiments of the present invention is shown in FIGS. 2-14. The mounting bracket 36 is preferably connected to an inner surface 22 of the rear fascia member 16, as shown in FIGS. 2-7. Alternatively, the mounting bracket 36 can be connected to another vehicle component, such as the bumper. The mounting bracket 36 is preferably disposed adjacent the inner surface 22 of the rear fascia member 16, as shown in FIGS. 5-7, 13 and 14.

The mounting bracket 36 has a bracket body 38 having a substantially rectangular shape, as shown in FIGS. 3, 4, 8 and 9. The bracket body 38 has first and second laterally extending members 40 and 42. The first and second laterally extending members 40 and 42 are preferably substantially parallel. First ends of the laterally extending members 40 and 42 are connected by a first connecting member 44. Second ends of the laterally extending members 40 and 42 are connected by a second connecting member 46. The first and second connecting members 44 and 46 are preferably substantially parallel. Preferably, the mounting bracket 36 is unitarily formed as a one-piece member. The mounting bracket 36 is preferably made of plastic, such as polypropylene, although any suitable material can be used.

A central opening 48 is disposed in the bracket body 38, as shown in FIGS. 2-4, 8 and 9. The central opening 48 is defined by the first and second laterally extending members 40 and 42 and the first and second connecting members 44 and 46. The central opening 48 preferably has a substantially rectangular shape. As shown in FIG. 1, the tow hitch receiver 28 and the electrical connector 30 of the tow hitch assembly pass through the central opening 48 in the bracket body 38.

Figure 3:
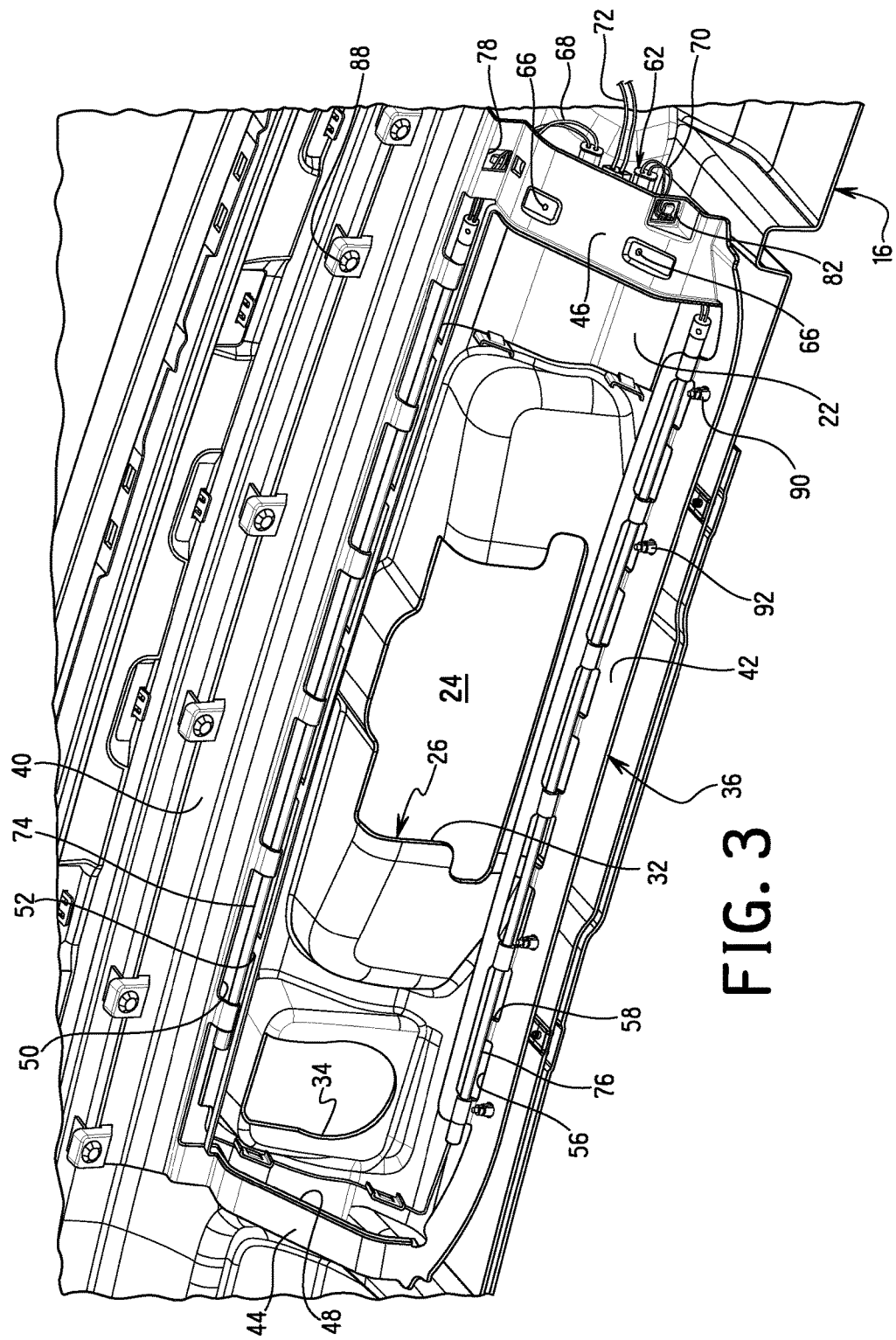
FIG. 3 is a rear perspective of the rear fascia of FIG. 2 in which an electronic control unit is connected between the mounting bracket and the rear fascia member.
Figure 4:
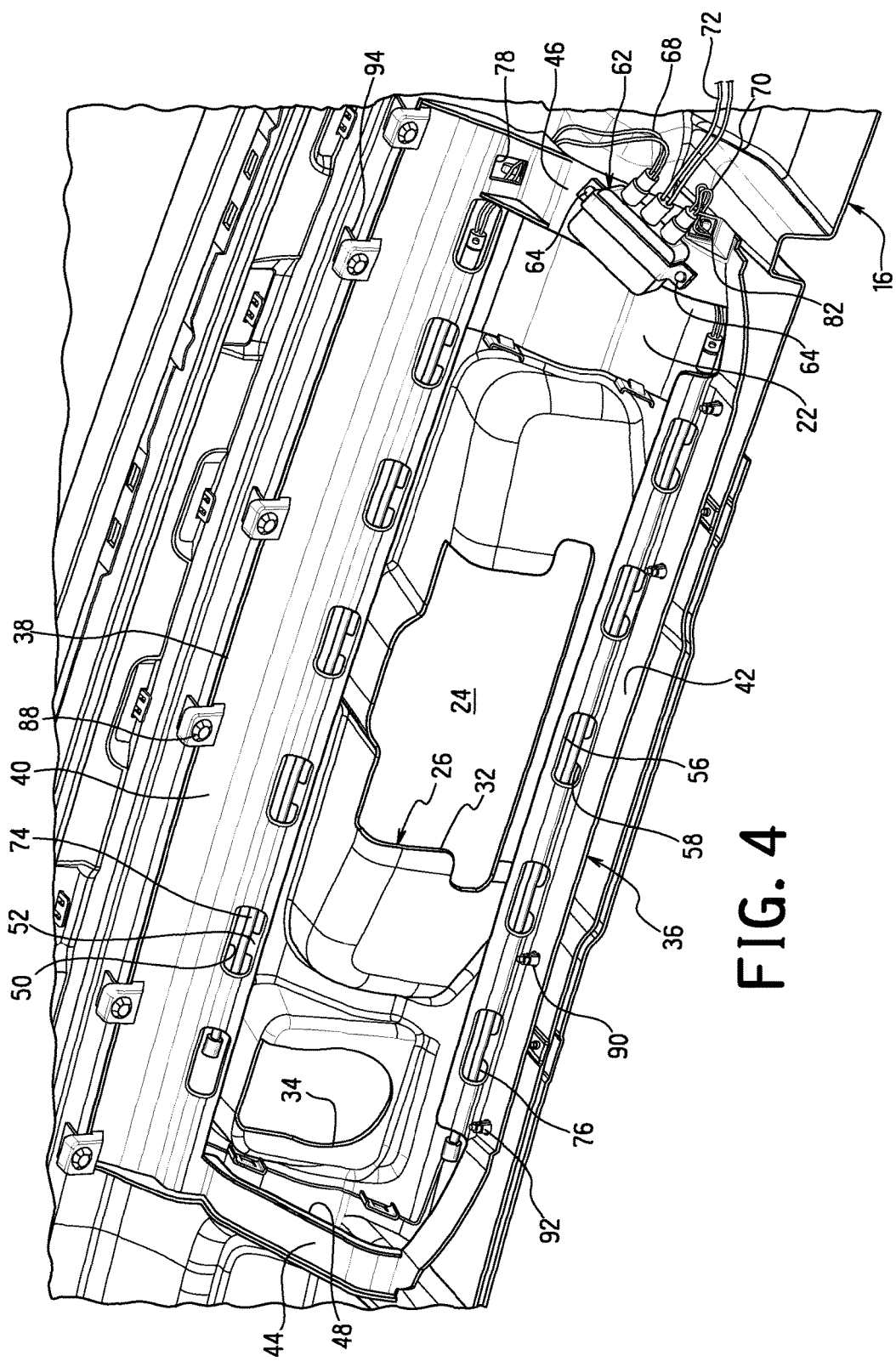
FIG. 4 is a rear perspective of the rear fascia of FIG. 2 in which an electronic control unit is connected to the mounting bracket such that the mounting bracket is disposed between the electronic control unit and the rear fascia member.

A plurality of upper sensor cutouts 50 are disposed in the first laterally extending member 40 of the bracket body 38, as shown in FIGS. 3, 4 and 8, and extend in a lateral direction of the vehicle. Seven upper sensor cutouts 50 are disposed in the first laterally extending member 40 as shown in FIG. 8, although any suitable number of upper sensor cutouts 50 can be disposed therein. A flexible hook 52 is formed in at least one of the upper sensor cutouts 50. Preferably, a flexible hook 52 is disposed in each of the upper sensor cutouts 50 except for the first and last upper sensor cutouts 50A and 50B, as shown in FIG. 2. The flexible hook 52 preferably extends from a lower edge of the upper sensor cutout 50 in a direction substantially perpendicular to a lateral direction of the vehicle. An upper channel 54 is formed in the first laterally extending member 40. An upper groove 55 is disposed in the bracket body 38 between adjacent upper sensor cutouts 50, as shown in FIGS. 3 and 4. The upper channel 54 is defined by the plurality of upper grooves 55 and the plurality of flexible hooks 52.

Figure 9:
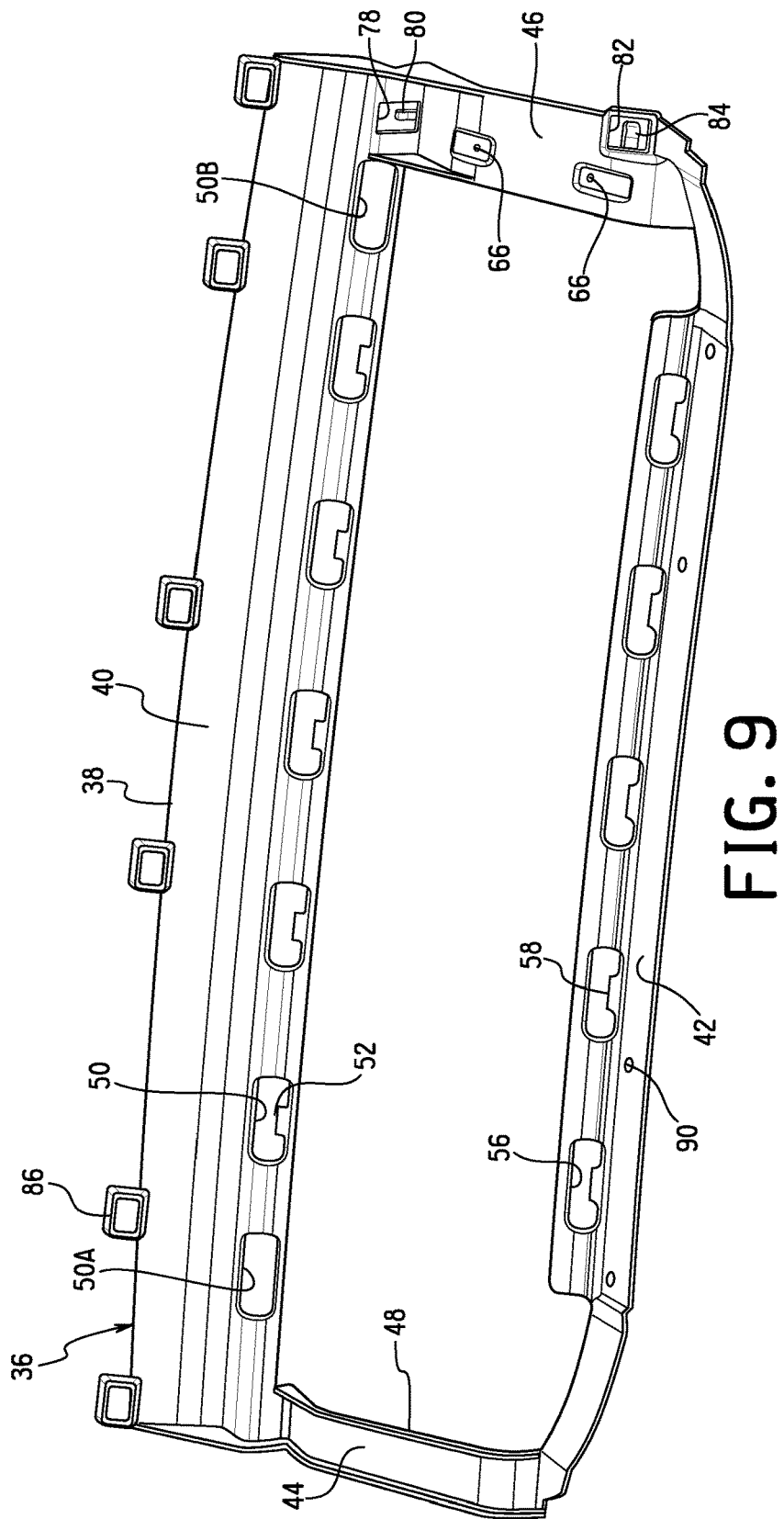
FIG. 9 is a perspective view of mounting bracket of FIG. 2.

A plurality of lower sensor cutouts 56 are disposed in the second laterally extending member 42 of the bracket body 38, as shown in FIGS. 3, 4 and 8, and extend in the lateral direction of the vehicle. Five lower sensor cutouts 56 are disposed in the second laterally extending member 42 as shown in FIG. 8, although any suitable number of lower sensor cutouts 56 can be disposed therein. A flexible hook 58 is formed in at least one of the lower sensor cutouts 56. Preferably, a flexible hook 58 is disposed in each of the lower sensor cutouts 56. The flexible hook 58 preferably extends from a lower edge of the lower sensor cutout 56 in a direction substantially perpendicular to a lateral direction of the vehicle. As shown in FIG. 4, the flexible hooks 52 and 58 extend in the same direction, as shown in FIGS. 4 and 9. A lower channel 60 is formed in the second laterally extending member 42. A lower groove 61 is disposed in the bracket body 38 between adjacent lower sensor cutouts 56, as shown in FIGS. 3 and 4. The lower channel 60 is defined by the plurality of lower grooves 61 and the plurality of flexible hooks 58.

The central opening 48 is disposed between the plurality of upper sensor cutouts 50 and the plurality of lower sensor cutouts 56. A length of the central opening 48 in the lateral direction of the vehicle is greater than a combined length of the plurality of upper sensor cutouts 50 in the lateral direction of the vehicle. The upper channel 54 is formed in the bracket body 38 and extends along the plurality of upper sensor cutouts 50. The length of the central opening 48 in the lateral direction of the vehicle is greater than a combined length of the plurality of lower sensor cutouts 56 in the lateral direction of the vehicle. The lower channel 60 is formed in the bracket body 38 and extends along the plurality of lower sensor cutouts 56.

An electronic control unit 62 is secured to a surface of the bracket body 38, as shown in FIGS. 3 and 4. The electronic control unit 62 has mounting tabs 64 for attaching the electronic control unit to the bracket body 38. Each mounting tab 64 has a fastener opening for receiving a fastener. Fastener openings 66 in the bracket body 38 receive the fasteners to secure the electronic control unit 62 to the bracket body 38 of the mounting bracket 36. As shown in FIG. 3, the electronic control unit 62 is disposed to an outer surface of the bracket body 38 such that the electronic control unit 62 is disposed between the bracket body 38 and the inner surface 22 of the rear fascia member 16. As shown in FIG. 4, the electronic control unit 62 is disposed to an inner surface of the bracket body 38 such that the mounting bracket 38 is disposed between the electronic control unit 62 and the rear fascia member 16. As shown in FIG. 4, the fastener openings 66 are disposed in the second connecting member 46 such that the electronic control unit 62 is connected to the second connecting member, although the fastener openings can be disposed in any suitable portion of the bracket body 38.

An upper sensor 74 is disposed in the upper channel 54 formed in the bracket body 38. The upper sensor 74 is retained in the upper channel 54 by the plurality of upper grooves 55 and the plurality of flexible fingers 52, as shown in FIGS. 5 and 6. Preferably, the plurality of upper grooves 55 and the plurality of flexible fingers 52 engage opposite sides of the upper sensor 74.

A lower sensor 76 is disposed in the lower channel formed in the bracket body 38. The lower sensor 76 is retained in the lower channel 60 by the plurality of lower grooves 61 and the plurality of flexible fingers 58, as shown in FIGS. 5 and 6. Preferably, the plurality of lower grooves 61 and the plurality of flexible fingers 58 engage opposite sides of the lower sensor 76.

The upper and lower sensors are electrically connected by wiring 68 and 70, respectively, to the electronic control unit 62. The upper and lower sensors are preferably proximity sensors. The proximity sensors can be capacitive sensors, or any other suitable type of sensor. Wiring 72 electrically connects the electronic control unit 62 to the main electrical harness (not shown) of the vehicle. As shown in FIGS. 3 and 4, the electronic control unit 62 is connected to the bracket body 38 between the upper sensor 74 and the lower sensor 76.

An upper wiring cutout 78 is disposed in the second connecting member 46 of the bracket body 38, as shown in FIGS. 3 and 4. A flexible finger 80 is disposed in the upper wiring cutout 78 to securely retain the wiring 68 extending between the upper sensor 74 and the electronic control unit 62. The flexible finger 80 extends laterally in the upper wiring cutout 78, as shown in FIGS. 3 and 4. Alternatively, the flexible finger 80 extends vertically, as shown in FIGS. 12 and 13, although the flexible finger 80 can extend in any suitable direction. The upper wiring cutout 78 is disposed proximate the electronic control unit 62 to facilitate securely retaining the wiring 68.

A lower wiring cutout 82 is disposed in the second connecting member 46 of the bracket body 38, as shown in FIGS. 3 and 4. A flexible finger 84 is disposed in the lower wiring cutout 82 to securely retain the wiring 70 extending between the lower sensor 76 and the electronic control unit 62. The flexible finger 84 extends laterally in the lower wiring cutout 82, as shown in FIGS. 3 and 4, although the flexible finger can extend in any suitable direction. As shown in FIGS. 3 and 4, the flexible fingers 80 and 84 extend in substantially the same direction. Alternatively, as shown in FIGS. 12-14, the flexible fingers 80 and 84 extend in substantially opposite directions. The lower wiring cutout 82 is disposed proximate the electronic control unit 62 to facilitate securely retaining the wiring 70.

A plurality of upper fastener openings 86 are disposed in the first laterally extending member 40 of the bracket body 38. Six upper fastener openings 86 are shown, although any suitable number can be used. A conventional spring clip 88, such as a gator clip, can be connected to each upper fastener opening 86. The spring clips 88 are disposed in the upper fastener openings 86 in any suitable manner, such as by a snap connect. The plurality of upper sensor cutouts 50 are disposed in the bracket body 38 between the plurality of upper fastener openings 86 and the central opening 48.

Figure 10:
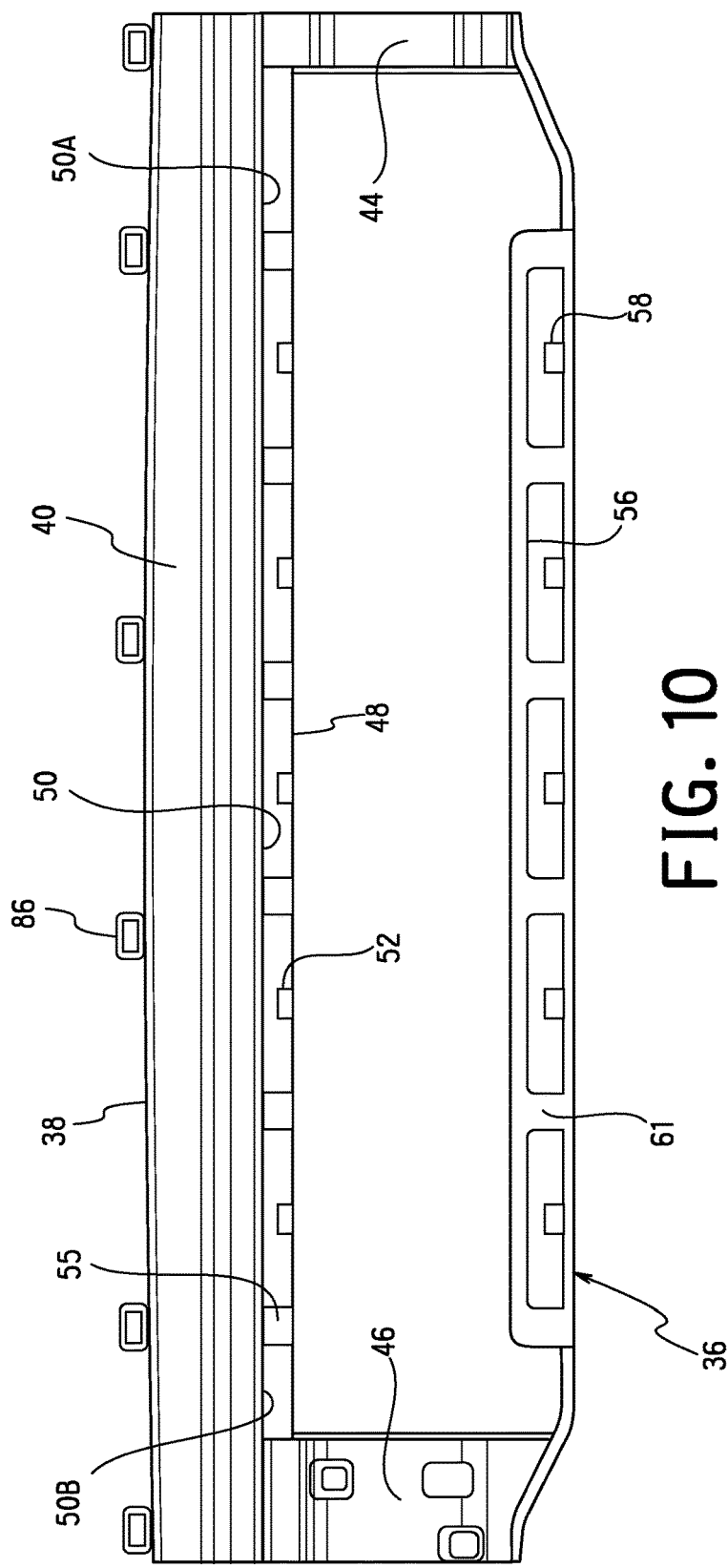
FIG. 10 is a front elevational view of the mounting bracket of FIG. 9.

A plurality of lower fastener openings 90 are disposed in the second laterally extending member 42 of the bracket body 38. Four lower fastener openings 90 are shown, although any suitable number can be used. As shown in FIGS. 8-10, the central opening 48 is disposed between the plurality of upper fastener openings 86 and the plurality of lower fastener openings 90. The plurality of lower sensor cutouts 56 are disposed in the bracket body 38 between the plurality of lower fastener openings 90 and the central opening 48.

The mounting bracket 36 is shown installed on a vehicle in FIGS. 5-7. The bracket body 38 is disposed adjacent the inner surface 22 of the rear fascia member 16. The central opening 48 in the bracket body 36 is aligned with the opening 24 in the rear fascia member 16, as shown in FIGS. 2, 3 and 7. Such configuration allows the tow hitch receiver 30 and the electrical connector 32 to pass through the mounting bracket 36, as shown in FIG. 1.

The spring clips 88 are first disposed in the upper fastener openings 86. The mounting bracket 36 is then connected to the rear fascia member 16 by passing projections 92 through the lower fastener openings 90 in the second laterally extending member 42, as shown in FIGS. 3 and 4. The projections 92 are preferably tapered to facilitate passing the projections 92 through the lower fastener openings 90. The projections 92 have a portion having a width larger than a width of the lower fastener openings to prevent the mounting bracket 36 from accidentally separating from the rear fascia member 16.

The spring clips 88 disposed in the upper fastener openings 86 are then brought into engagement with tabs 94 that project outwardly from the inner surface 22 of the rear fascia member 16, as shown in FIGS. 3 and 4. As shown in FIG. 7, ends of the tabs 94 pass through ends of the spring clips 88 that are biased together, thereby securely retaining the mounting bracket 36 to the rear fascia member 16.

The electronic control unit 62 can be secured to the mounting bracket either before or after securing the mounting bracket to the rear fascia member 16. The upper and lower sensors 74 and 76 can also be disposed in the upper and lower grooves prior to or after installation of the mounting bracket 36 to the rear fascia member 16. Wiring 68 from the upper sensor 74 and wiring 70 from the lower sensor 76 are connected to the electronic control unit 62. Wiring 68 is received by the flexible finger 80 to clamp the wiring 68 against a rear surface 37 of the bracket body 36 as shown in FIGS. 3, 4, 8 and 11, thereby substantially preventing movement of the wiring 68. Wiring 70 is received by the flexible finger 84 to clamp the wiring 70 against a rear surface 37 of the bracket body 36, thereby substantially preventing movement of the wiring 70.

Wiring 72 is connected between the electronic control unit 62 and the main wiring harness of the vehicle, as shown in FIGS. 3, 4 and 8. When a vehicle key fob carried by a vehicle user is recognized, motion of the vehicle user's foot in the proximity of one of the sensors 74 and 76 causes the liftgate to open.

As shown in FIGS. 12-14, the mounting bracket 36 is installable on a vehicle not equipped with a tow hitch assembly. The mounting bracket 36 is substantially identical to the mounting bracket described above with respect to FIGS. 2-11. The rear fascia member 116 is substantially similar to the rear fascia member 16 of FIGS. 1-7 except that the rear fascia member 116 does not have a tow hitch assembly such that the rear fascia member 116 does not have a tow hitch receiver opening therein. Similar elements of the rear fascia member 116 are identified with the same reference numeral as the rear fascia member 16, except in the 100 series, i.e., "1xx."

The rear fascia member 116 does not have an opening therein aligned with the central opening 48 in the bracket body 36. As shown in FIGS. 12-14, an inner surface 122 of the rear fascia member 116 extends substantially continuously from the first connecting member 44 to the second connecting member 46. Accordingly, the mounting bracket 36 for a hands-free liftgate sensor in accordance with the exemplary embodiments of the present invention can be used with a vehicle equipped with a tow hitch assembly and a vehicle not equipped with a tow hitch assembly.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above exemplary embodiment, the following directional terms "forward", "rearward", "above", "downward", "vertical", "horizontal", "below" and "transverse" as well as any other similar directional terms refer to those directions of a vehicle.

The terms of degree such as "substantially", "generally", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another exemplary embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the exemplary embodiments according to the present invention are provided for illustration only, and not for the purpose of limiting the invention as defined by the appended claims and their equivalents.

What is claimed is:

1. A mounting bracket for a hands-free liftgate sensor of a vehicle, comprising:
    a bracket body having a substantially rectangular shape configured to be disposed adjacent an inner surface of a vehicle rear fascia member, the bracket body including first and second laterally extending members;
    a plurality of upper sensor cutouts disposed in the first laterally extending member of the bracket body and extending in a lateral direction of the vehicle, each of the plurality of upper sensor cutouts extending entirely through the first laterally extending member;
    a plurality of lower sensor cutouts disposed in the second laterally extending member of the bracket body and extending in the lateral direction of the vehicle, each of the plurality of lower sensor cutouts extending entirely through the second laterally extending member; and
    a central opening in the bracket body disposed between the plurality of upper sensor cutouts and the plurality of lower sensor cutouts.

2. The mounting bracket for a hands-free liftgate sensor of a vehicle according to claim 1, wherein
    an electronic control unit is secured to a surface of the bracket body.

3. The mounting bracket for a hands-free liftgate sensor of a vehicle according to claim 2, wherein
    a length of the central opening in the lateral direction of the vehicle is greater than a combined length of the plurality of upper sensor cutouts in the lateral direction of the vehicle.

4. The mounting bracket for a hands-free liftgate sensor of a vehicle according to claim 1, wherein
    a channel is formed in the bracket body for receiving a sensor.

5. The mounting bracket for a hands-free liftgate sensor of a vehicle according to claim 4, wherein
    the channel extends along the plurality of upper sensor cutouts or along the plurality of lower sensor cutouts.

6. The mounting bracket for a hands-free liftgate sensor of a vehicle according to claim 5, wherein
    a flexible hook is formed in at least one of the plurality of upper sensor cutouts or in at least one of the plurality of lower sensor cutouts to securely retain the sensor in the channel.

7. The mounting bracket for a hands-free liftgate sensor of a vehicle according to claim 2, wherein
    an upper sensor is disposed in an upper channel formed in the bracket body; and
    a lower sensor is disposed in a lower channel formed in the bracket body, the upper and lower sensors being electrically connected to the electronic control unit.

8. The mounting bracket for a hands-free liftgate sensor of a vehicle according to claim 7, wherein
    the upper channel extends along the plurality of upper sensor cutouts; and
    the lower channel extends along the plurality of lower sensor cutouts.

9. The mounting bracket for a hands-free liftgate sensor of a vehicle according to claim 8, wherein
    an upper flexible hook is formed in at least one of the plurality of upper sensor cutouts to securely retain the upper sensor in the upper channel; and
    a lower flexible hook is formed in at least one of the plurality of lower sensor cutouts to securely retain the lower sensor in the lower channel.

10. The mounting bracket for a hands-free liftgate sensor of a vehicle according to claim 9, wherein
    an upper wiring cutout is disposed in the bracket body proximate the electronic control unit, an upper flexible finger being disposed in the upper wiring cutout to securely retain wiring extending between the upper sensor and the electronic control unit; and
    a lower wiring cutout is disposed in the bracket body proximate the electronic control unit, an upper flexible finger being disposed in the upper wiring cutout to securely retain wiring extending between the lower sensor and the electronic control unit.

11. A hands-free liftgate sensor mounting bracket for a vehicle, comprising:
    a vehicle body structure;
    a rear fascia member connected to the vehicle body structure;
    a mounting bracket connected to the rear fascia member, the mounting bracket including
        a bracket body including first and second laterally extending members;
        a plurality of upper fastener openings disposed in the first laterally extending member and receiving a plurality of first fasteners to secure the bracket body to the rear fascia member, each of the upper fastener openings extending entirely through the first laterally extending member;
        a plurality of lower fastener openings disposed in the second laterally extending member and receiving a plurality of second fasteners to secure the bracket body to the rear fascia member, each of the plurality of lower fastener openings extending entirely through the second laterally extending member; and
        a central opening in the bracket body disposed between the plurality of upper fastener openings and the plurality of lower fastener openings.

12. The hands-free liftgate sensor mounting bracket for a vehicle according to claim 11, further comprising
    a tow hitch assembly secured to the vehicle body structure, the tow hitch assembly passing through the central opening in the bracket body.

13. The hands-free liftgate sensor mounting bracket for a vehicle according to claim 11, wherein
    an electronic control unit is secured to a surface of the bracket body;
    an upper sensor is disposed in an upper channel formed in the bracket body; and
    a lower sensor is disposed in a lower channel formed in the bracket body, the upper and lower sensors being electrically connected to the electronic control unit.

14. The hands-free liftgate sensor mounting bracket for a vehicle according to claim 13, wherein
the electronic control unit is disposed between the bracket body and the rear fascia member.

15. The hands-free liftgate sensor mounting bracket for a vehicle according to claim 13, wherein
a plurality of upper sensor cutouts are disposed in the bracket body between the plurality of upper fastener openings and the central opening; and
a plurality of lower sensor cutouts are disposed in the bracket body between the plurality of lower fastener openings and the central opening.

16. The hands-free liftgate sensor mounting bracket for a vehicle according to claim 15, wherein
the upper channel extends along the plurality of upper sensor cutouts; and
the lower channel extends along the plurality of lower sensor cutouts.

17. The hands-free liftgate sensor mounting bracket for a vehicle according to claim 16, wherein
an upper flexible hook is formed in each of the plurality of upper sensor cutouts to securely retain the upper sensor in the upper channel; and
a lower flexible hook is formed in each of the plurality of lower sensor cutouts to securely retain the lower sensor in the lower channel.

18. The hands-free liftgate sensor mounting bracket for a vehicle according to claim 17, wherein
an upper wiring cutout is disposed in the bracket body proximate the electronic control unit, an upper flexible finger being disposed in the upper wiring cutout to securely retain wiring extending between the upper sensor and the electronic control unit; and
a lower wiring cutout is disposed in the bracket body proximate the electronic control unit, an upper flexible finger being disposed in the upper wiring cutout to securely retain wiring extending between the lower sensor and the electronic control unit.

19. The hands-free liftgate sensor mounting bracket for a vehicle according to claim 18, wherein
an upper groove is disposed in the bracket body between adjacent upper wiring cutouts to facilitate receiving the upper sensor; and
a lower groove is disposed in the bracket body between adjacent lower wiring cutouts to facilitate receiving the lower sensor.

20. The hands-free liftgate sensor mounting bracket for a vehicle according to claim 13, wherein
the electronic control unit is connected to the bracket body between the upper and lower sensors.

\* \* \* \* \*